US010846020B2

(12) United States Patent
Kotzur et al.

(10) Patent No.: US 10,846,020 B2
(45) Date of Patent: Nov. 24, 2020

(54) DRIVE ASSISTED STORAGE CONTROLLER SYSTEM AND METHOD

(71) Applicant: Dell Products L.P., Round Rock, TX (US)

(72) Inventors: Gary B. Kotzur, Austin, TX (US); Marcelo Silva Saraiva, Austin, TX (US); William Emmett Lynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/179,595

(22) Filed: Nov. 2, 2018

(65) Prior Publication Data

US 2020/0142633 A1 May 7, 2020

(51) Int. Cl.

| | |
|---|---|
| ***G06F 3/06*** | (2006.01) |
| ***G06F 13/28*** | (2006.01) |
| ***G06F 13/42*** | (2006.01) |
| ***G06F 13/16*** | (2006.01) |

(52) U.S. Cl.

CPC .......... *G06F 3/0659* (2013.01); *G06F 3/0604* (2013.01); *G06F 3/0656* (2013.01); *G06F 3/0688* (2013.01); *G06F 13/1668* (2013.01); *G06F 13/28* (2013.01); *G06F 13/4282* (2013.01); *G06F 2213/0026* (2013.01); *G06F 2213/28* (2013.01)

(58) Field of Classification Search

CPC ..................................................... G06F 3/0659

See application file for complete search history.

(56) References Cited

U.S. PATENT DOCUMENTS

| | | | | |
|---|---|---|---|---|
| 2003/0120699 A1* | 6/2003 | Hostetter | G06F 11/2074 | 718/101 |
| 2007/0300027 A1* | 12/2007 | Ali | G06F 11/2087 | 711/162 |
| 2016/0092539 A1* | 3/2016 | Compton | G06F 16/275 | 707/611 |
| 2018/0335961 A1* | 11/2018 | Colline | G06F 3/0619 | |
| 2019/0243548 A1* | 8/2019 | Duncan | G06F 3/0656 | |
| 2019/0294565 A1* | 9/2019 | Pinto | G06F 13/1668 | |

* cited by examiner

*Primary Examiner* — Edan Orgad
*Assistant Examiner* — Won Tae C Kim
(74) *Attorney, Agent, or Firm* — Haynes and Boone, LLP

(57) ABSTRACT

A drive assisted storage controller system includes a first storage device that is coupled to a bus that includes a data path and a control path. The first storage device receives via the control path from a storage controller, a first peer-to-peer write command that identifies a host memory address included in a memory system, a first storage location provided in the first storage device, and a second storage location provided in a second storage device coupled to the bus. The first storage device retrieves, via the data path from the host memory address, first write data such that the first write data is not provided through the storage controller. The first storage device provides, via the control path to the second storage device, a second peer-to-peer write command that includes the second storage location. The second peer-to-peer write command causes the second storage device to retrieve the first write data from the first storage device via the data path.

20 Claims, 4 Drawing Sheets

DRIVE ASSISTED STORAGE CONTROLLER SYSTEM AND METHOD

BACKGROUND

The present disclosure relates generally to information handling systems, and more particularly to drive assisted storage in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as servers often utilize storage systems such as, for example, Redundant Array of Independent Disk (RAID) storage systems. Many RAID storage systems divide and replicate data among multiple storage devices such as hard disk drives (HDDs), solid state drives (SSDs), or other storage devices known in the art. For example, servers often access storage devices in RAID storage systems via storage controllers that manage the storage devices and present them to the servers as logical units, with those storage controllers running on an input/output processor (IOP), either as a standalone device or integrated within a RAID On Chip (ROC). When the RAID storage system includes HDDs, it may take several hundred to several thousand HDDs to saturate the bandwidth and IOP performance of a storage controller. However, when Serial Attached SCSI (SAS) SSDs or Serial Advanced Technology Attachment (SATA) SSDs are used in the RAID storage system, it may only take 8 to 16 drives to saturate the IOP performance of a storage controller, while non-volatile memory express (NVMe) SSDs may only require 2 to 3 drives to saturate the IOP performance. When a number of SSDs required in a system cause the IOP performance to become saturated, additional hardware (e.g., additional storage controllers) is required for the RAID storage system to perform optimally, which increases the costs associated with the system.

Accordingly, it would be desirable to provide an improved storage system.

SUMMARY

According to one embodiment, a drive assist storage device includes a first storage module; a first processing system coupled to the storage module; and a first memory system that is coupled to the first processing system and that includes instructions that, when executed by the first processing system, cause the first processing system to provide a drive assist engine that is configured to: receive, via a control path of a bus that couples the first processing system to a storage controller, a first peer-to-peer write command that identifies a host memory address included in a second memory system that is coupled to the first processing system via the bus, a first storage location provided in the first storage module, and a second storage location provided in a first storage device coupled to the bus; retrieve, via a data path of the bus from the host memory address included in the second memory system, first write data, wherein the first write data is not provided through the storage controller; and provide, via the control path to the second storage device, a second peer-to-peer write command that includes the second storage location, wherein the second peer-to-peer write command causes the second storage device to retrieve the first write data from the first processing system via the data path.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
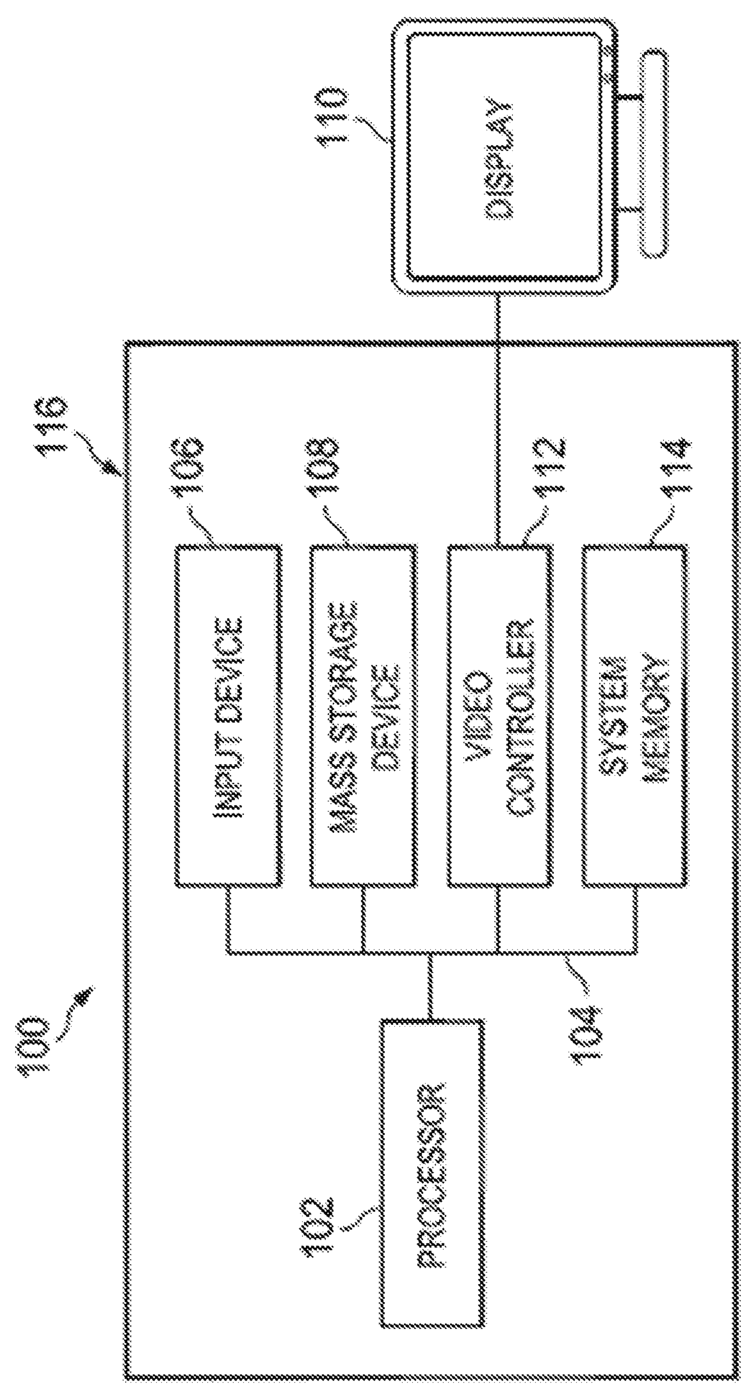
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
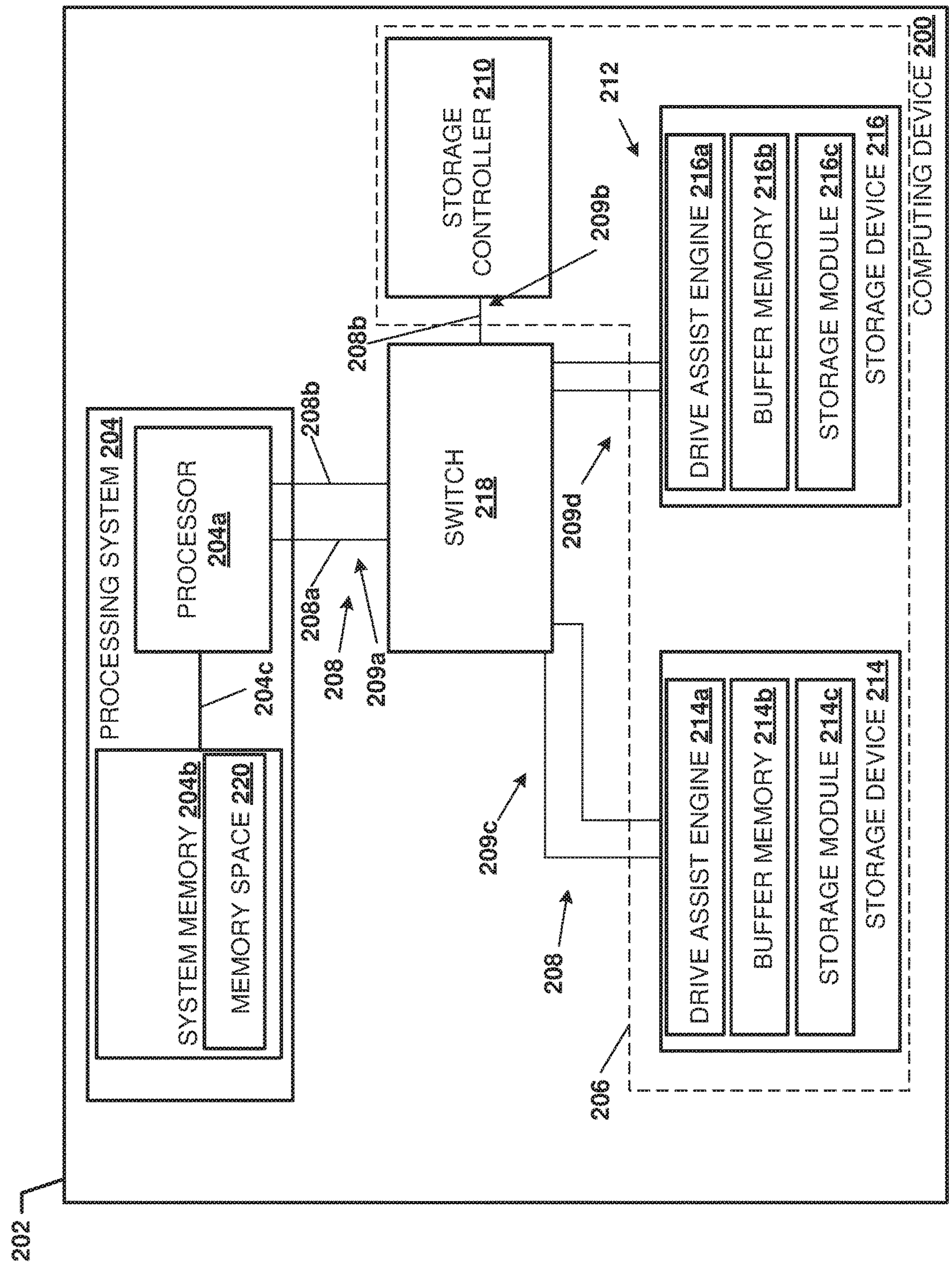
FIG. 2 is a schematic view illustrating an embodiment of a computing device including the drive assisted storage system of the present disclosure.

Referring now to FIG. 2, an embodiment of a computing device 200 is illustrated that may be provided by the IHS 100 discussed above with reference to FIG. 1, and/or may include some or all of the components of the IHS 100. In specific examples, the computing device 200 may be provided by a server device, although one of skill in the art in possession of the present disclosure will recognize that storage devices, networking devices, and/or other computing devices known in the art may benefit from the teachings of the present disclosure and thus will fall within its scope as well. In the illustrated embodiment, the computing device 200 includes a chassis 202 that houses the components of the computing device 200, only some of which are illustrated in FIG. 2. For example, the chassis 202 houses a processing system 204 that includes a processor **204*a* coupled to system memory 204*b* via a system memory bus 204*c* (e.g., a double data rate (DDR) bus), and may include a variety of other processing components that would be apparent to one of skill in the art in possession of the present disclosure. For example, the processor 204*a* in the processing system 204 may include the processor 102 discussed above with reference to FIG. 1, and the system memory 204*b* in the processing system 204 may include the system memory 114 discussed above with reference to FIG. 1. However, one of skill in the art in possession of the present disclosure will recognize that the processing system 204 in the computing device 200 may be provided by a variety of processing systems utilized by the computing device 200 to perform processing functions related to, for example, running an operating system, while remaining within the scope of the present disclosure. In an embodiment, the system memory 204*b* may include a memory space 220 (e.g., a PCIe memory space) that may include an address space that is provided in a CPU memory space of the system memory 204*b*. For example, the memory space 220 may be the CPU memory space of the system memory 204*b*** that is consumed by PCIe devices for non-configuration purposes.

The chassis also houses a drive assist storage system 206 that is coupled to the processing system 204 via a bus 208 (e.g., provided between the processor **204*a* and the drive assist storage system 206). The bus 208 may be a Peripheral Component Interface (PCI)/Peripheral Component Interface Express (PCIe) connection. However, one of skill in the art in possession of the present disclosure will recognize that the bus 208 may be any variety of physical/logical bus connections while remaining within the scope of the present disclosure. The bus 208 may include a data path 208*a* and a control path 208*b* that may be provided on separate physical connections, or provided via separate logical connections. The drive assist storage system 206 may include a storage controller 210 and a storage device array 212 that includes a plurality of storage devices such as the storage device 214 and the storage device 216 illustrated in FIG. 2. In some examples, the storage controller 210 may be provided by the IHS 100 discussed above with reference to FIG. 1 and/or may include some or all of the components of the IHS 100. The storage controller 210 may include a variety of storage controller hardware and software for enabling storage controller functionality that would be apparent to one of skill in the art in possession of the present disclosure. In a specific example, the storage controller 210** may be provided by a Redundant Array of Independent Disk (RAID) controller, although other storage controllers are envisioned as falling within the scope of the present disclosure.

In an embodiment, either or both of the storage devices 214 and 216 may include the storage device 108 discussed above with reference to FIG. 1, and in some examples may be provided by the IHS 100 discussed above with reference to FIG. 1, and/or may include some or all of the components of the IHS 100. For example, the storage devices 214 and 216 may be NVMe storage devices (e.g., NVMe SSDs). In another example, the components of the storage devices 214 and 216 may include a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a drive assist engine **214*a* and a drive assist engine 216*a*, respectively, that are configured to perform the functions of the drive assist engines discussed below. The storage devices 214 and 216 may also include a buffer memory 214*b* and a buffer memory 216*b*, respectively. The buffer memory 214*b* and 216*b* may be provided by volatile memory such as, for example, a DRAM chip, and may be coupled to the drive assist engine 214*a* and the drive assist engine 216*a*, respectively. The buffer memory 214*b* and 216*b* may be used as a cache that is configured to store incoming data in preparation for writing to a storage module 214*c* and a storage module 216*c*, respectively. The storage module 214*c* and storage module 216*c* may include non-volatile memory such as, for example, NAND flash memory, phase change memory (PCM), and/or any other non-volatile memory that would be apparent to one of skill in the art in possession of the present disclosure. In various embodiments, the storage device 214, the storage device 216, and the storage controller 210 may be coupled to the bus 208 via a device connector (e.g., a PCI/PCIe connector) that couples to a device slot (e.g., a PCI/PCIe slot) that is connected to the bus 208**

In the illustrated embodiment, the chassis 202 houses a switch 218 (e.g., a PCIe switch) that is coupled to the processing system 204 via a bus link **209*a*, that is coupled to the storage controller 210 via a bus link 209*b*, that is coupled to the storage device 214 via a bus link 209*c*, and that is coupled to the storage device 216 via a bus link 209*d*. The switch 218 may be configured to provide peer-to-peer communications between endpoint devices (e.g., the storage controller 210, the storage device 214, and the storage device 216). However, in embodiments in which the interfaces the processor 204*a* that are coupled to the bus 208 are configured to allow peer-to-peer communications between the endpoint devices on the bus 208, the switch 218 may be omitted. While a specific embodiment of a computing device 200 and a drive assist storage system 206 has been illustrated and described, one of skill in the art in possession of the present disclosure will recognize that a wide variety of modification to the computing device 200 and the drive assist storage system 206** will fall within the scope of the present disclosure as well.

Figure 3:
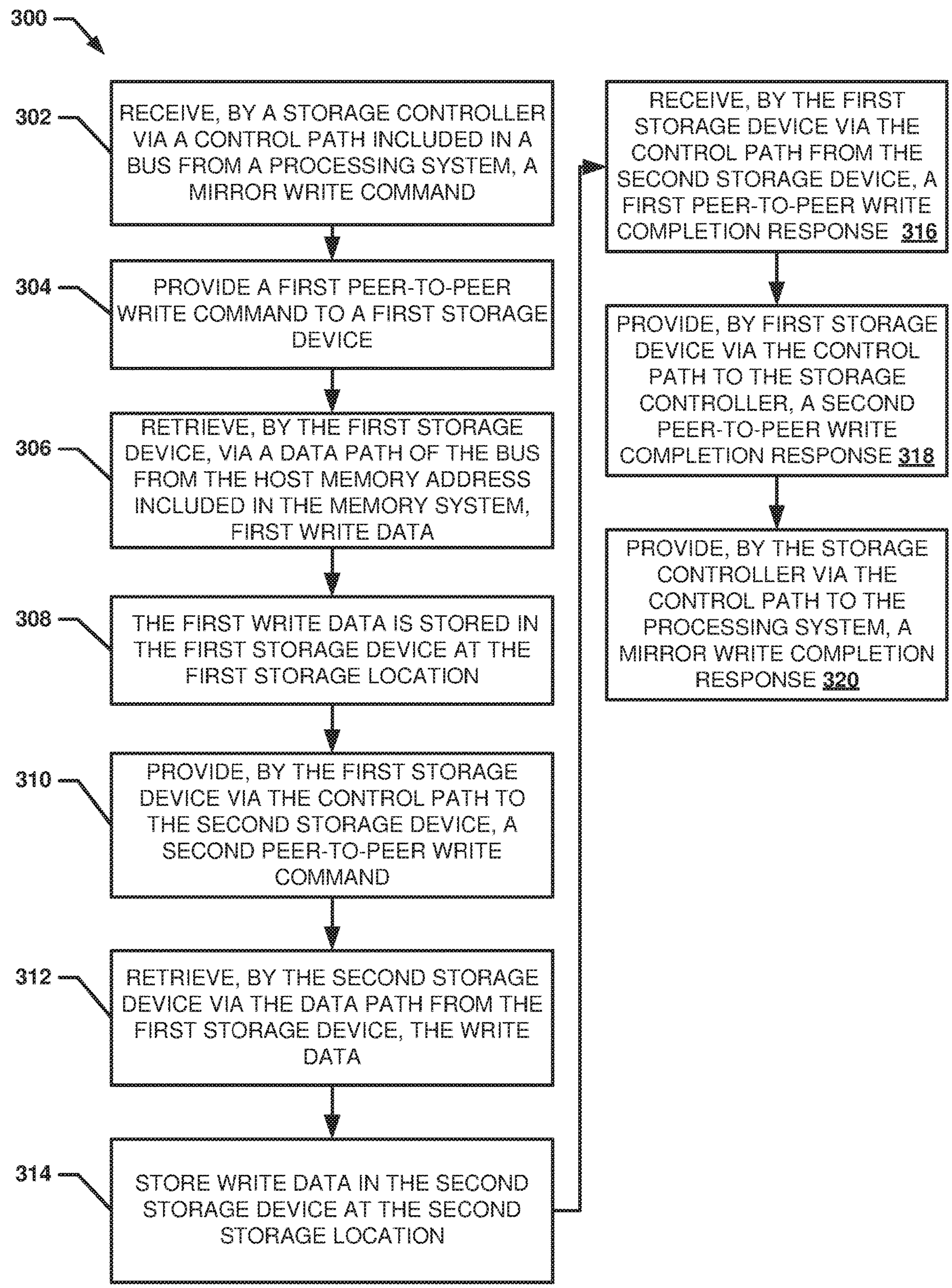
FIG. 3 is a flow chart illustrating an embodiment of a method for providing drive assisted data mirroring.

Referring now to FIG. 3, an embodiment of a method 300 for providing drive assisted data mirroring is illustrated. As discussed above, SSDs such as NVMe SSDs present a unique challenge for storage controllers (e.g., RAID controllers) in that the aggregate performance capabilities of the NVMe SSDs far outstrip the performance capability of the storage controllers (e.g., the bandwidth and/or IOP performance of the storage controllers). A problem with conventional storage systems is that that a storage controller is positioned in the data-path, and by positioning the storage controller in the data-path, the storage controller is constrained by the bandwidth of the host bus link (e.g., the PCIe lane width). For example, conventional RAID controllers typically support an x8 PCIe host link, and higher performance conventional RAID controllers can support up to an x16 PCIe host link. However, even with an x16 PCIe host link, a conventional RAID controller is only able to support four x4 NVMe SSDs at full bandwidth.

Another problem with conventional storage systems is that the storage controller is used to split up the storage commands (e.g., RAID commands) and coalesce multiple response interrupts coming from the storage devices (e.g., the NVMe SSDs) into a single response to the processing system, which requires a significant amount of processing power on the part of the storage controller. For example, if the processing system issues a RAID 1 write command (e.g., a data mirroring command) to the RAID controller, the RAID controller splits the RAID 1 write command into two write commands, one for each SSD. The SSDs then set up two direct memory access (DMA) operations to pull the data from the system memory, which requires the data to move twice across a DDR interface between the CPU and the system memory, twice through the CPU, twice through the RAID controller, in order to reach a drive. Once each SSD has the data, the SSD will issue a command response to the RAID controller, and once both SSDs have responded, the RAID controller will coalesce the two SSDs responses into a single command response to the host processing system. This process is inefficient in both the number of times the data must transition the system memory bus, and the number of interrupts the RAID controller has to process.

The systems and methods of the present disclosure move the storage controller out of the data path and allow the storage devices to conduct peer-to-peer communications, which allows the response interrupt processing to be distributed between the various SSDs included in the storage system. The storage devices and the storage controller may be coupled to the processing system through a switch, or otherwise coupled to the processing system, such that the storage controller is not within the data path as well. As such, the storage controller is only used for command processing and error handling, and does not participate in data transfers. Furthermore, the storage devices and the storage controller may communicate via peer-to-peer transactions. The discussion below refers to the concept of a RAID controller that is removed from the data-path as a "lookaside RAID controller". The moving of the RAID controller out of the data-path allows the amount of bandwidth available for data transfer to scale with the number of SSDs attached to the system, while the PCIe device host-to-switch link is not constrained to a single PCIe link width, and instead can scale to match the aggregate link width of the SSDs.

Figure 4:
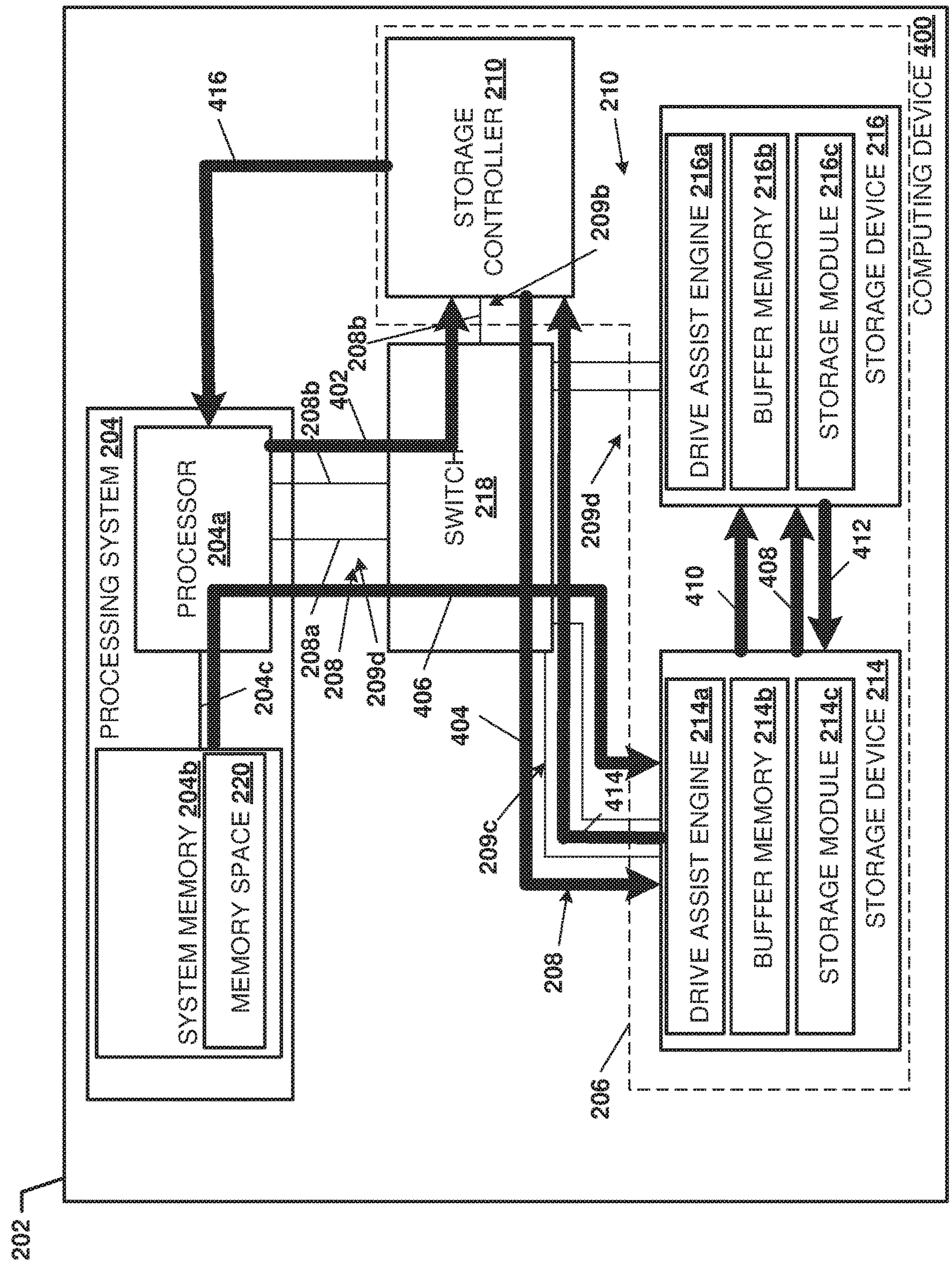
FIG. 4 is a schematic view illustrating an embodiment of communications in the computing device of FIG. 2 via the drive assisted storage system of the present disclosure during the method of FIG. 3.

The method 300 begins at block 302 where a storage controller may receive, from a processing system via a control path included in a bus, a mirror write command. In an embodiment of block 302 and with reference to a computing device 400 of FIG. 4 (which may be the computing device 200 of FIG. 2), the processor 204*a* may issue a mirror write command 402 (e.g., a RAID1 write command) to the storage controller 210. For example, the mirror write command 402 may identify a host memory address in the system memory 204*b* where the write data for the mirror write command 402 is stored. The processor 204*a* may provide the mirror write command 402 to the storage controller 210 via the control path 208*b* of the bus 208 and, in some examples, over the bus links 209*a* and 209*b* via the switch 218. The storage controller 210 may receive the mirror write command 402, and may map the mirror write command 402 to a first storage location (e.g., a first logical block address (LBA) range) in the storage device 214, and to a second storage location (e.g., a second LBA range) in the storage device 216.

The method 300 then proceeds to block 304 where the storage controller provides a first peer-to-peer write command to a first storage device of a plurality of storage devices in a drive assisted storage system. In an embodiment of block 304 and with reference to the computing device 400 of FIG. 4, the storage controller 210 may issue a peer-to-peer write command 404. The peer-to-peer write command 404 may identify the host memory address, the first storage location, and the second storage location. For example, the storage controller 210 may select the storage device 214 from the plurality of storage devices in the drive assist storage system 206 to receive the peer-to-peer write command based on available storage space. The storage controller 210 may provide, to the storage device 214 via the control path 208*b* of the bus 208, the peer-to-peer write command 404. In some examples, the peer-to-peer write command 404 may be provided over the bus link 209*b* and the bus link 209*c* via the switch 218. Thus, at block 304, the storage device 214 receives the peer-to-peer write command 404.

The method 300 then proceeds to block 306 where the first storage device retrieves, via a data path of the bus from the host memory address included in the memory system, first write data. In an embodiment of block 306 and with reference to the computing device 400 of FIG. 4, the drive assist engine 214*a* in the storage device 214 may retrieve data from the host memory address identified in the first peer-to-peer write command 404. For example, the drive assist engine 214*a* may retrieve the write data from the system memory 204*b* via the data path 208*a* of the bus 208. For example, the drive assist engine 214*a* may set up a direct memory access (DMA) operation 406, and pull the write data from the system memory 204*b*. Thus, the drive assist engine 214*a* retrieves the write data directly from the system memory 204*b*, and without the write data passing through the storage controller 210 as is required in conventional storage systems. In some examples, the write data may be provided over the bus link 209*a* and the bus link 209*c* via the switch 218.

The method 300 then proceeds to block 308 where the first write data is stored in the first storage device at the first storage location. In an embodiment of block 308, the drive assist engine 214*a* may store the write data in the buffer memory 214*b* until the drive assist engine 214*a* can write the write data to the first storage location in the storage module 214*c*. Once the drive assist engine 214*a* is able to process the write data in the buffer memory 214*b*, the drive assist engine 214*a* may write the write data to the first storage location in the storage module 214*c*. In an embodiment, the write data may remain in the buffer memory 214*b* until the mirror operation of storing the write data at the second storage location on the storage device 216 has completed, as discussed below. In an embodiment, at least a portion of the buffer memory 214*b* of the storage device 214, and/or at least a portion of the buffer memory 216*b* of the storage device 216, may be mapped to the memory space 220 (e.g., a PCIe memory space). The write data associated with the mirror write command may be stored in the at least a portion of the buffer memory 214*b* that is mapped to the memory space 220.

The method 300 then proceeds to block 310 where the first storage device provides, via the control path to the second storage device, a second peer-to-peer write command. In an embodiment of block 310 and with reference to the computing device 400 of FIG. 4, the drive assist engine 214*a* of the storage device 214 may issue a peer-to-peer write command 408, and provide the peer-to-peer write command 408 to the storage device 216 via the control path 208*b*. In some examples, the peer-to-peer write command 408 may be provided over the bus link 209*c* and the bus link 209*d* via the switch 218. The peer-to-peer write command 408 may identify the second storage location on the storage device 216, and a buffer memory location of the buffer memory 214*b* where the write data is stored in the storage device 214. Thus, at block 310, the storage device 216 receives the peer-to-peer write command 408.

The method 300 then proceeds to block 312 where the second storage device retrieves, from the first storage device via the data path, the write data. In an embodiment of block 312 and with reference to the computing device 400 of FIG. 4, the drive assist engine 216*a* of the storage device 216 may retrieve the write data from the buffer memory address identified in the peer-to-peer write command 408. The drive assist engine 214*a* may retrieve the write data via the data path 208*a* of the bus 208 from the buffer memory 214*b* using the mappings of the portions of the buffer memory 214*b* in the memory space 220. For example, the drive assist engine 216*a* may set up a direct memory access (DMA) operation 410, and pull the write data from the buffer memory 214*b*. Thus, the drive assist engine 216*a* retrieves the write data directly from the buffer memory 214*b*, and without the write data passing through the storage controller 210. In some examples, the write data may be provided over the bus link 209*c* and the bus link 209*d* via the switch 218. In conventional storage systems, when a mirror write command is issued by a processing system (e.g., like the processing system 204), storage devices connected to that processing system (e.g., the storage devices 214 and 216) perform a DMA operation to retrieve the write data from the system memory 204*b*. Thus, in the systems and methods of the present disclosure, the write data only transitions the system memory bus 204*c* once, which improves the utilization of the system memory 204*b*.

The method 300 then proceeds to block 314 where the write data is stored in the second storage device at the second storage location. In an embodiment of block 314, the drive assist engine 216*a* may store the write data in the buffer memory 216*b* until the drive assist engine 216*a* can write the write data to the second storage location in the storage module 216*c*. Once the drive assist engine 216*a* can process the write data in the buffer memory 216*b*, the drive assist engine 216*a* may write the write data to the second storage location in the storage module 216*c*.

The method 300 then proceeds to block 316 where the first storage device receives, from the second storage device via the control path, a first peer-to-peer write completion response that indicates that operations associated with the second peer-to-peer write command have completed. In an embodiment of block 316 and with reference to the computing device 400 of FIG. 4, in response to the writing the write data to the second storage location in the storage module 216*c*, the drive assist engine 216*a*, may issue a peer-to-peer write completion response 412. For example, the drive assist engine 216*a* may provide, to the storage device 214 via the control path 208*b*, the peer-to-peer write completion response 412 that indicates that operations associated with the peer-to-peer write command 408 have completed. In some examples, the peer-to-peer write completion response 412 may be provided over the bus link 209*d* and the bus link 209*c* via the switch 218. Thus, at block 316, the storage device 214 receives the peer-to-peer write completion response 412.

The method 300 then proceeds to block 318 where the first storage device provides, to the storage controller via the control path, a second peer-to-peer write completion response. In an embodiment of block 318 and with reference to the computing device 400 of FIG. 4, in response to the writing the write data to the first storage location in the storage module 214*c* and the receiving the peer-to-peer write completion response 412, the drive assist engine 214*a* may issue a peer-to-peer write completion response 414. For example, the drive assist engine 214*a* may provide, to the storage controller 210 via the control path 208*b*, the peer-to-peer write completion response 414. In some examples, the peer-to-peer write completion response 414 may be provided over the bus link 209*c* and the bus link 209*b* via the switch 218. The peer-to-peer write completion response 414 indicates that operations associated with the peer-to-peer write command 408 have completed at storage device 216, and that the memory write operation 406 has completed at the storage device 214. Thus, at block 318, the storage controller receives the peer-to-peer write completion response 414.

The method 300 then proceeds to block 320 where the storage controller provides, to the processing system via the control path, a mirror write completion response that indicates that operations associated with the mirror write command have completed. In an embodiment of block 320 and with reference to the computing device 400 of FIG. 4, in response to the receiving the peer-to-peer write completion response 414, the storage controller 210 may issue a mirror write completion response 416. For example, the storage controller 210 may reference the mapping of the mirror write command 402 to the first storage location in the storage device 214 and the second storage location in the storage device 216 in determining that the peer-to-peer write completion response 414 is associated with the mirror write command 402. The storage controller 210 may provide, to the processor 204*a* via the control path 208*b*, the mirror write completion response 416 that indicates that operations associated with the mirror write command 402 have completed. In some examples, the mirror write completion response 416 may be provided over the bus link 209*b* and the bus link 209*a* via the switch 218. Thus, at block 320, the processor 204*a* receives the mirror write completion response 416, and the method 300 ends. As such, the storage controller only processes one response interrupt instead of two, which is required in conventional storage system when a RAID1 write is performed which allows the storage controller of the present disclosure to increase its overall IOP performance.

Thus, systems and methods have been described that provide a storage device that assists, during a mirror write operation, a lookaside storage controller that does not lie in the data path for data writes that is provided from a system memory to the storage device. Using peer-to-peer communication capabilities of the storage devices and the storage controller in a storage system, a first storage device may directly retrieve write data from a memory system, and a second storage device that is mirroring the write data may retrieve the write data from a storage location on the first storage device. As such, write data for a mirror write command only has to traverse a bus between the memory system and a processor once, which improves memory utilization of a computing device. Furthermore, the storage controller only has to process one response interrupt instead of two, which increases its overall IOP performance. Additionally, by moving the storage controller out of the datapath, the amount of bandwidth available for data transfer can scale with the number of storage devices attached to the storage system. Furthermore, the host-to-switch link is not constrained to a single link width, and can scale to match the aggregate link width of the storage devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A drive assisted storage controller system, comprising:
- a bus that includes a data path and a control path;
- a processing system that is coupled to the data path and the control path included in the bus;
- a memory system that is coupled to the processing system; and
- a storage system that includes:
  - a storage controller that is coupled to the control path included in the bus; and
  - a plurality of storage devices that are each coupled to the data path and the control path included in the bus, wherein a first storage device that is included in the plurality of storage devices is configured to:
    - receive, via the control path from the storage controller, a first peer-to-peer write command that identifies a host memory address included in the memory system, a first storage location provided in the first storage device, and a second storage location provided in a second storage device that is included in the plurality of storage devices;
    - retrieve, via the data path from the host memory address included in the memory system, first write data, wherein the first write data is not provided through the storage controller; and
    - provide, via the control path to the second storage device, a second peer-to-peer write command that includes the second storage location and a memory location in the first storage device at which the first write data is stored, wherein the second peer-to-peer write command causes the second storage device to retrieve the first write data from the memory location in the first storage device via the data path.

2. The system of claim 1, wherein the storage controller is configured to:
- receive, via the control path included in the bus from the processing system, a mirror write command that includes the host memory address included in the memory system;
- map the mirror write command to the first storage location and the second storage location; and
- provide the first peer-to-peer write command to the first storage device via the control path.

3. The system of claim 1, wherein the first storage device is configured to:
- receive, via the control path from the second storage device, a first peer-to-peer write completion response that indicates that the second peer-to-peer write command has completed; and
- provide, via the control path to the storage controller, a second peer-to-peer write completion response that indicates that the first peer-to-peer write command has completed, wherein the second peer-to-peer write completion response causes the storage controller to provide, via the control path to the processing system, a mirror write completion response that indicates that a mirror write command has completed.

4. The system of claim 1, further comprising:
- a bus switch that is coupled to the processing system via a first bus link included in the bus, that is coupled to the storage controller via a second bus link included in the bus, that is coupled to the first storage device via a third bus link included in the bus, and that is coupled to the second storage device via a fourth bus link included in the bus, wherein the bus switch enables the storage controller and the plurality of storage devices to issue peer-to-peer commands.

5. The system of claim 1, wherein the first storage device is configured to:
- store the first write data in the first storage device at the first storage location.

6. The system of claim 1, wherein the second storage device is configured to:
- store the first write data in the second storage device at the second storage location.

7. The system of claim 1, wherein the first storage device is configured to:
- map a buffer memory included in the first storage device to an interconnect memory space, wherein the buffer memory provides the memory location;
- store the first write data at the memory location provided in the buffer memory; and
- provide the memory location in the second peer-to-peer write command, wherein the second storage device retrieves, via the data path from the memory location, the first write data using the mapped buffer memory provided in the interconnect memory space and the memory location.

8. The system of claim 1, wherein the first storage device is configured to:
- receive, via the control path from the second storage device, a third peer-to-peer command that includes a third storage location of second write data provided in the second storage device; and
- retrieve, via the data path from the second storage device, second write data from the third storage location.

9. A drive assist storage device, comprising:
- a first storage module;
- a first processing system coupled to the first storage module; and a first memory system that is coupled to the first processing system and that includes instructions that, when executed by the first processing system, cause the first processing system to provide a drive assist engine that is configured to:

receive, via a control path of a bus that couples the first processing system to a storage controller, a first peer-to-peer write command that identifies a host memory address included in a second memory system that is coupled to the first processing system via the bus, a first storage location provided in the first storage module, and a second storage location provided in a first storage device coupled to the bus;

retrieve, via a data path of the bus from the host memory address included in the second memory system, first write data, wherein the first write data is not provided through the storage controller; and provide, via the control path to the first storage device, a second peer-to-peer write command that includes the second storage location and a memory location in the first memory system at which the first write data is stored after the first write data is retrieved from the second memory system, wherein the second peer-to-peer write command causes the first storage device to retrieve the first write data from the memory location via the data path.

10. The device of claim 9, wherein the drive assist engine is configured to:

receive, via the control path from the first storage device, a first peer-to-peer write completion response that indicates that the second peer-to-peer write command has completed; and provide, via the control path to the storage controller, a second peer-to-peer write completion response that indicates that the first peer-to-peer write command has completed, wherein the second peer-to-peer write completion response causes the storage controller to provide, via the control path to a second processing system coupled to the second memory system, a mirror write completion response that indicates that a mirror write command has completed.

11. The device of claim 9, wherein the drive assist engine is configured to:

store the first write data in the first storage module at the first storage location.

12. The device of claim 9, further comprising:

a buffer memory coupled to the first processing system, wherein the drive assist engine is configured to:

map a portion of the buffer memory to a memory space, wherein the buffer memory provides the memory location;

store the first write data at the memory location provided in the portion of the buffer memory; and provide the memory location in the second peer-to-peer write command, wherein the first storage device retrieves, via the data path from the memory location, the first write data using the mapped buffer memory provided in the memory space and the memory location.

13. The device of claim 9, wherein the drive assist engine is configured to:

receive, via the control path from the first storage device, a third peer-to-peer command that includes a third storage location of second write data provided in the first storage device; and retrieve, via the data path from the first storage device, second write data from the third storage location.

14. A method of drive assisted storage, comprising:

receiving, by a first storage device coupled to a bus via a control path of the bus from a storage controller, a first peer-to-peer write command that identifies a host memory address included in a memory system included in a processing system coupled to the bus, a first storage location provided in the first storage device, and a second storage location provided in a second storage device coupled to the bus;

retrieving, by the first storage device via a data path of the bus from the host memory address included in the memory system, first write data, wherein the first write data is not provided through the storage controller; and providing, by the first storage device via the control path to the second storage device, a second peer-to-peer write command that includes the second storage location and a memory location in the first storage device at which the first write data is stored after the first write data is retrieved from the memory system, wherein the second peer-to-peer write command causes the second storage device to retrieve the first write data from the memory location in the first storage device via the data path.

15. The method of claim 14, further comprising:

receiving, by the storage controller via the control path from a processing system coupled to the bus, a mirror write command that includes the host memory address included in the memory system;

mapping, by the storage controller, the mirror write command to the first storage location and the second storage location; and providing, by the storage controller via the control path to the first storage device, the first peer-to-peer write command.

16. The method of claim 14, further comprising:

receiving, by the first storage device via the control path from the second storage device, a first peer-to-peer write completion response that indicates that the second peer-to-peer write command has completed; and providing, by the first storage device via the control path to the storage controller, a second peer-to-peer write completion response that indicates that the first peer-to-peer write command has completed, wherein the second peer-to-peer write completion response causes the storage controller to provide, via the control path to the processing system, a mirror write completion response that indicates that a mirror write command has completed.

17. The method of claim 14, further comprising:

storing, by the first storage device, the first write data in the first storage device at the first storage location.

18. The method of claim 14, further comprising:

storing, by the second storage device, the first write data in the second storage device at the second storage location.

19. The method of claim 14, further comprising:

mapping, by the first storage device, a buffer memory included in the first storage device to an interconnect memory space, wherein the buffer memory provides the memory location;

storing, by the first storage device, the first write data at the memory location provided in the buffer memory; and providing, by the first storage device, the memory location in the second peer-to-peer write command, wherein the second storage device retrieves, via the data path from the memory location, the first write data using the mapped buffer memory provided in the interconnect memory space and the memory location.

20. The method of claim 14, further comprising:

receiving, by the first storage device via the control path from the second storage device, a third peer-to-peer command that includes a third storage location of second write data provided in the second storage device; and retrieving, by the first storage device via the data path from the second storage device, second write data from the third storage location.

* * * * *